United States Patent
Mizuno et al.

(10) Patent No.: US 9,156,231 B2
(45) Date of Patent: Oct. 13, 2015

(54) STEEL FOR MACHINE STRUCTURE USE FOR SURFACE HARDENING AND STEEL PART FOR MACHINE STRUCTURE USE

(71) Applicant: NIPPON STEEL & SUMITOMO METAL CORPORATION, Tokyo (JP)

(72) Inventors: Atsushi Mizuno, Tokyo (JP); Masayuki Hashimura, Tokyo (JP); Hajime Saitoh, Tokyo (JP); Shuji Kozawa, Tokyo (JP); Kei Miyanishi, Tokyo (JP)

(73) Assignee: NIPPON STEEL & SUMITOMO METAL CORPORATION, Tokyon (JP)

(*) Notice: Subject to any disclaimer, the term of this patent is extended or adjusted under 35 U.S.C. 154(b) by 0 days.

(21) Appl. No.: 13/845,972

(22) Filed: Mar. 18, 2013

(65) Prior Publication Data
US 2013/0220489 A1    Aug. 29, 2013

Related U.S. Application Data

(60) Division of application No. 12/734,813, which is a continuation of application No. PCT/JP2009/066326, filed on Sep. 11, 2009.

(30) Foreign Application Priority Data

Dec. 19, 2008 (JP) ................. 2008-324643

(51) Int. Cl.
*C22C 38/06* (2006.01)
*C22C 38/12* (2006.01)
(Continued)

(52) U.S. Cl.
CPC . *B32B 15/04* (2013.01); *C21D 1/06* (2013.01); *C21D 1/10* (2013.01); *C21D 9/32* (2013.01); *C22C 38/001* (2013.01); *C22C 38/02* (2013.01); *C22C 38/04* (2013.01); *C22C 38/06* (2013.01); *C22C 38/12* (2013.01); *C22C 38/22* (2013.01); *C22C 38/24* (2013.01); *C22C 38/38* (2013.01); *C23C 8/26* (2013.01); *C23C 8/32* (2013.01); *C21D 2211/004* (2013.01); *C21D 2211/005* (2013.01); *C21D 2211/008* (2013.01); *C21D 2211/009* (2013.01)

(58) Field of Classification Search
None
See application file for complete search history.

(56) References Cited

U.S. PATENT DOCUMENTS 6,475,305 B1    11/2002    Watari et al.
2004/0190808 A1    9/2004    Maeda et al.
(Continued)

FOREIGN PATENT DOCUMENTS

CN    1293716    1/2000
CN    1534212    10/2004
(Continued)

OTHER PUBLICATIONS

English translation for JP 11-335732.*
(Continued)

*Primary Examiner* — Yoshitoshi Takeuchi
(74) *Attorney, Agent, or Firm* — Kenyon & Kenyon LLP

(57) ABSTRACT

Steel for machine structure use for surface hardening containing, by mass %, C: 0.3 to 0.6%, Si: 0.02 to 2.0%, Mn: 1.5% to 3.0%, W: 0.0025 to 0.5%, Al: 0.001 to 0.5%, N: 0.003 to 0.02%, S: 0.0001 to 0.025%, P: 0.0001 to 0.03%, and O: 0.0001 to 0.0050%, having an Mn/S of 70 to 30000, and having a balance of substantially Fe and unavoidable impurities.

6 Claims, 3 Drawing Sheets

(51) Int. Cl.

| | |
|---|---|
| C22C 38/18 | (2006.01) |
| C22C 38/22 | (2006.01) |
| C22C 38/24 | (2006.01) |
| C22C 38/38 | (2006.01) |
| B32B 15/04 | (2006.01) |
| C21D 1/06 | (2006.01) |
| C21D 1/10 | (2006.01) |
| C21D 9/32 | (2006.01) |
| C22C 38/00 | (2006.01) |
| C22C 38/02 | (2006.01) |
| C22C 38/04 | (2006.01) |
| C23C 8/26 | (2006.01) |
| C23C 8/32 | (2006.01) |

(56) References Cited

U.S. PATENT DOCUMENTS

2008/0276458 A1 11/2008 Maeda et al.
2008/0279714 A1 11/2008 Hashimura et al.

FOREIGN PATENT DOCUMENTS

| | | | | |
|---|---|---|---|---|
| CN | 1961091 | | 5/2007 | |
| JP | 55-145155 | | 12/1980 | |
| JP | 06-017189 | | 1/1994 | |
| JP | 06-172961 | | 6/1994 | |
| JP | 06-172961 A | | 6/1994 | |
| JP | 06-287708 | * | 10/1994 | ............. C22C 38/00 |
| JP | 07-090363 | | 4/1995 | |
| JP | 07-090364 | | 4/1995 | |
| JP | 10-259421 | | 3/1997 | |
| JP | 10-226817 | | 8/1998 | |
| JP | 10-259421 | * | 9/1998 | ............. C21D 6/00 |
| JP | 11-335732 | * | 12/1999 | ............. C21D 8/00 |
| JP | 2004-183589 | | 7/2004 | |
| JP | 2004-244665 | | 9/2004 | |
| JP | 2005-023375 | | 1/2005 | |
| JP | 2007-077411 | | 3/2007 | |
| JP | 2007-177317 | | 7/2007 | |
| JP | 2008-013788 A | | 1/2008 | |

OTHER PUBLICATIONS

ERnglish translation for JP 06-287708.*
English translation of JP 10-259421 (1998).*

* cited by examiner (a)

(b)

STEEL FOR MACHINE STRUCTURE USE FOR SURFACE HARDENING AND STEEL PART FOR MACHINE STRUCTURE USE

This application is a divisional application of U.S. application Ser. No. 12/734,813, filed May 24, 2010, a national stage application of International Application No. PCT/JP2009/066326, filed Sep. 11, 2009, which claims priority to Japanese Application No. 2008-324643, filed Dec. 19, 2008, each of which is incorporated by reference in its entirety.

TECHNICAL FIELD

The present invention relates to steel for machine structure use for surface hardening and in particular a steel part for machine structure use having a high contact fatigue strength applied to a gear, continuously variable transmission, constant velocity joint, hub, or other power transmission part for an automobile etc.

BACKGROUND ART

Steel parts for machine structure use, for example, gears of automatic transmissions, sheaves of continuously variable transmissions, constant velocity joints, hubs, bearings and other power transmission parts require high contact fatigue strength.

In the past, in general, the above parts have been obtained by working materials such as JIS SCr420, SCM420, or other C: 0.2% or so case hardened steel into parts, then treating them by carburized quenching to form C: 0.8% or so martensite structure hardened layers on the surfaces of the parts and improve the contact fatigue strength.

However, carburized quenching is accompanied with austenite transformation at a 950° C. or so high temperature and is treated for a long period of 5 to 10 hours, in some cases, 10 hours or more, so larger heat treatment deformation due to coarsening of the crystal grains (distortion during quenching) is difficult to avoid.

For this reason, when a steel part requires high precision, after carburized quenching, the steel part has to be ground, honed, or otherwise finished.

In addition to this, in recent years, there has been a rising demand for reduction of the noise of automobile engines etc., so surface hardening methods with smaller heat distortion compared with carburized quenching such as induction hardening and soft nitriding have come into focus.

Induction hardening is a method of austenizing and quenching only the required part of the surface layer part of a steel material by heating for a short time and enables a surface hardened part with small distortion during quenching to be obtained with good precision. However, if trying to use just induction hardening to obtain a hardness equivalent to that of a carburized quenched material, 0.8% or more of C has to be added.

If the amount of C in the steel becomes 0.8% or more, the internal hardness, which is unnecessary for improvement of the contact fatigue strength, also rises and the machineability remarkably deteriorates, so it is not possible to just increase the amount of C in the steel. There are limits to improving the contact fatigue strength by just induction hardening.

Soft nitriding is a surface hardening method mainly causing nitrogen and carbon to simultaneously diffuse in and permeate the surface of a steel material to form a hardened layer in the 500 to 600° C. temperature range, which is less than the transformation point, and improve the wear resistance, seize resistance, fatigue resistance, etc.

The surface of the steel material is formed with nitrides by the diffused nitrogen. Usually, at the surfacemost layer of the steel material, a compound layer mainly comprised of $Fe_3N$, $Fe_4N$, or other Fe nitrides is formed. Inside, a nitrided layer with N diffused in it is formed.

Soft nitriding can be performed at a low temperature. Further, compared with carburization, the treatment time is a short one of 2 to 4 hours or so, therefore this is often used for the production of steel parts requiring low distortion. However, with just soft nitriding, the hardened layer depth is shallow, so this cannot be used for transmission gears etc. to which a high contact pressure is applied.

In recent years, as a technique making up for the defects of induction hardening and soft nitriding and giving better mechanical properties, in particular better contact fatigue strength, performing soft nitriding, then induction hardening has been experimented with (see PLT's 1 to 7).

For example, PLT 1 discloses the method of combining induction hardening and gas soft nitriding to make up for their respective defects and obtain excellent mechanical properties, in particular, high contact fatigue strength by improvement of the softening resistance.

However, with the method of PLT 1, the surface hardness is high, but the concentration of N in the nitrided layer is low, so the high temperature hardness is low, sufficient softening resistance cannot be obtained at the surface of the gear etc. becoming high in temperature during operation, and in the final analysis a high contact fatigue strength cannot be obtained.

PLT 2 also discloses the method of combining induction hardening and soft nitriding to produce parts for machine structure use excellent in mechanical strength. With the method of PLT 2, to enable the nitrides to form a solid solution, 900° C. to 1200° C. high temperature induction heating is necessary.

However, the amounts of addition of elements with a high affinity with N which promote the breakdown and dispersion of nitrides are insufficient, so high temperature heating is required. Therefore, the surface of the steel material is formed with an oxide layer to a remarkable extent and the mechanical properties end up greatly deteriorating.

Further, with the method of PLT 2, no consideration is given to the method of forming a thick compound layer, so good contact fatigue strength cannot be obtained under a high contact pressure.

PLT 3 discloses a method of production of a part for machine structure use excellent in mechanical strength characterized by treating steel comprised of, by wt %, C: 0.35 to 0.65%, Si: 0.03 to 1.50%, Mn: 0.3 to 1.0%, Cr: 0.1 to 3.0%, and a balance of Fe and impurities by soft nitriding under conditions giving a nitrided layer depth of 150 μm or more, then by induction hardening under conditions where the nitrided layer austenizes.

However, in the method of production of PLT 3, no consideration is given to raising the contact fatigue strength by the formation of a required thickness of a nitrided layer.

PLT 4 discloses a method of heat treatment of a machine part characterized by soft nitriding an iron-based material worked into the shape of a part so as to make nitrogen diffuse in and permeate the surface layer and form a compound layer, then induction hardening the part under conditions where the compound layer is consumed, the diffusion layer of the newly formed surface layer is denitrided, and a porous layer is formed at the surfacemost part.

However, in the heat treatment method of PLT 4, no consideration is given to raising the contact fatigue strength by the formation of a required thickness of a nitrided layer.

PLT 5 discloses a roller support shaft used for a cam follower device made of an iron-based alloy containing Cr, Mo, V, and W in a total of 1.0 to 20.0 wt % and C and N in a total of 0.5 to 1.2 wt % and having a balance of unavoidable impurities and Fe, nitrided at its surface, then induction quenched at the outer peripheral parts other than the two ends.

However, in the roller support shaft of PLT 5, no consideration is given to raising the contact fatigue strength by the formation of a required thickness of a nitrided layer.

PLT 6 also discloses a method of combining induction hardening and nitriding to obtain excellent mechanical properties. However, the nitriding in the method of PLT 6 is performed at a high temperature of 600° C. or more, so the compound layer is thin. Furthermore, the N concentration in it is low, so the amount of N diffusing due to decomposition at the time of induction hardening is also small.

In the end, with the nitriding of PLT 6, while a compound layer can be formed, formation of a thick, high N concentration nitrided layer is difficult, so even if combined with induction hardening, formation of a high softening resistance, good contact fatigue strength nitrided layer is not possible.

PLT 7 discloses steel for machine structure use excellent in strength, ductility, toughness, and wear resistance characterized by containing, by mass %, C: over 0.30%, 0.50% or less, Si: 1.0% or less, Mn: 1.5% or less, Mo: 0.3% to 0.5%, Ti: 0.1% or less, and B: 0.0005% to 0.01%, having a balance of Fe and unavoidable impurities, having at its surface a hardened layer of a thickness 50 μm or less and a Vicker's hardness of 750 or more, and having structures other than said hardened layer with an old austenite grain size of 10 μm or less, a martensite percentage of 90% or more, and a Vicker's hardness of 450 to less than 750.

However, the steel for machine structure use of PLT 7 does not form the required thickness of nitrided layer and raise the contact fatigue strength, so even if this can be applied to a metal belt of a continuously variable transmission, it is difficult to apply this to gears of automatic transmissions, sheaves of continuously variable transmissions, constant velocity joints, hubs, and other power transmission parts subjected to high contact pressures.

Whatever the case, steel for structural use for surface hardening able to be used for power transmission parts subjected to high contact pressures has not been provided up to now.

CITATION LIST

Patent Literature

PLT 1: Japanese Patent Publication (A) No. 06-172961
PLT 2: Japanese Patent Publication (A) No. 07-090363
PLT 3: Japanese Patent Publication (A) No. 07-090364
PLT 4: Japanese Patent Publication (A) No. 10-259421
PLT 5: Japanese Patent Publication (A) No. 2004-183589
PLT 6: Japanese Patent Publication (A) No. 2007-077411
PLT 7: Japanese Patent Publication (A) No. 2007-177317

SUMMARY OF INVENTION

Technical Problem

The present invention, in view of this situation, has as its task making up for the defects of the low surface hardness or internal hardness resulting from just induction hardening or soft nitriding by combining induction hardening and soft nitriding and providing a steel part for machine structure use excellent in contact fatigue strength (i) provided with a high surface hardness, internal hardness, and temper softening resistance unable to be obtained by a conventional soft nitrided and induction hardened steel part and, furthermore, (ii) formed with a sufficient lubricating film at its operating surface and a steel for machine structure use for surface hardening use used for said steel part.

Solution to Problem

To raise the contact fatigue strength of the steel part, (i) improvement of the surface hardness, (ii) increase of the depth of the hardened layer, and (iii) improvement of the softening resistance for maintaining high temperature strength at an operating surface becoming high in temperature (around 300° C.) are effective. Furthermore, to prevent seizure of operating surfaces and sticking, it is effective to form a sufficient lubricating film.

Based on this, the inventors engaged in intensive research on the surface hardening of steel parts by combination of soft nitriding and induction heat treatment and obtained the following discoveries:

(a) To increase the softening resistance, forming a nitrided layer with a high N concentration is effective. With just nitriding, even if a compound layer can be formed, formation of a high N concentration, thick nitrided layer is difficult and increasing the softening resistance is impossible.

To increase the softening resistance, it is necessary to use the compound layer formed at the time of soft nitriding (layer mainly comprised of $Fe_3N$, $Fe_4N$, or other Fe nitrides) as a source of supply of N and use the later performed induction heating to break down the compound and cause a sufficient amount of N to diffuse in the steel.

Here, FIG. 1 shows an example of the cross-sectional distribution of hardness from the surface to the core direction in a soft nitrided material and a soft nitrided and induction hardened material.

In a soft nitrided material, the surfacemost layer of the nitrided layer (see FIG. 2(a), FIG. 2(a) explained later) is formed with a compound layer and, as shown in FIG. 1, exhibits an extremely high hardness, but the compound layer is thin.

Further, with induction heating, it is learned that the compound layer at the surfacemost layer breaks down, N diffuses inside, and the surfacemost layer falls somewhat in hardness, but the hardened layer (nitrided layer) effective for improving the contact fatigue strength increases.

Note that, the surface layer structure of a quenched, soft nitrided material is martensite and the core is a ferrite-pearlite structure.

If making the thickness of the compound layer breaking down by induction hardening 10 μm or more, it is possible to increase the thickness of the high N concentration nitrided layer. The compound layer formed by nitridation becomes a brittle compound layer and is degraded in mechanical properties in some cases depending on the nitridation conditions, so usually effort is made to reduce the thickness of the compound layer.

As opposed to this, the present invention is characterized by deliberately making the thickness of the compound layer greater to deliberately utilize the properties of the compound layer. That is, the present invention increases the thickness of the compound layer to form martensite containing a large amount of N at the time of induction hardening and obtain a structure with a high softening resistance.

In the present invention, due to the formation of a structure with a high softening resistance, the softening resistance at the time of a high temperature is strikingly increased.

(b) At the time of soft nitriding, to form a thick compound layer, it is necessary to reduce the amount of S inhibiting the formation of Fe—N compounds. If S forms a solid solution in the steel material on its own, it will concentrate at the surface of the steel material and inhibit nitriding. To suppress this action of S, a certain amount or more of Mn is added to immobilize the S as MnS and render it harmless.

Mn, if added in an amount satisfying Mn/S≥70, suppresses the action of S and exhibits a remarkable effect for formation of a compound layer. Provided, however, that Mn/S is preferably 30000 or less.

(c) At the time of induction heating, to promote the breakdown of the compound layer and diffusion of N into the steel and increase the nitrided layer depth, it is necessary to add the required amount of W with a high affinity with N. Due to the addition of W, the N concentration in the nitrided layer remarkably increases and, furthermore, the nitrided layer increases in depth and the softening resistance is improved.

Due to the addition of W, even at a low temperature of less than 900° C., it is possible to sufficiently promote the diffusion of N. In this way, it is possible to lower the heating temperature, so it is possible to prevent the deterioration of the mechanical properties due to the effect of refining the size of the crystal grains and the effect of reducing the oxide layer.

(d) To prevent seizure or sticking of the operating surfaces, it is effective to provide oil reservoirs so that a film of a lubricant is formed without break. The present invention is characterized by the formation of a compound layer at the surface layer of the steel material by soft nitriding and then using the subsequent induction heating for austenization for hardening and thereby form a nitrided layer.

FIG. 2 show an example of a nitride layer observed by an optical microscope and a scan type electron microscope. FIG. 2(a) shows a nitride layer observed by an optical microscope, while FIG. 2(b) shows a nitride layer observed by a scan type electron microscope (enlargement of layer part).

From FIG. 2(b), it will be understood that the nitride layer is a hard, porous layer with a large number of pores functioning as oil reservoirs due to breakdown of the compound layer. Due to the nitride layer including a large number of pores, the lubricating effect is improved and the wear resistance and durability are greatly improved.

By controlling the soft nitriding and induction heating conditions, it is possible to form pores of a circle equivalent diameter of 0.1 μm to 1 μm in dimensions in a density of 10000/mm² or more in the nitrided layer from the surface down to a depth of 5 μm or more. The pores in the nitrided layer effectively function as oil reservoirs.

The present invention was completed based on the above findings and has as its gist the following:

(1) Steel for machine structure use for surface hardening containing, by mass %,
C: 0.3 to 0.6%,
Si: 0.02 to 2.0%,
Mn: 1.5% to 3.0%,
W: 0.0025 to 0.5%,
Al: 0.001 to 0.5%,
N: 0.003 to 0.02%,
S: 0.0001 to 0.025%,
P: 0.0001 to 0.03%, and
O: 0.0001 to 0.005%,
having an Mn/S of 70 to 30000, and
having a balance of substantially Fe and unavoidable impurities.

(2) Steel for machine structure use for surface hardening as set forth in (1), characterized by further containing, by mass %, one or more of
Cr: 0.01 to 2.0%,
Mo: 0.01 to 1.0%, and
V: 0.01 to 1.0%.

(3) Steel for machine structure use for surface hardening as set forth in (1) or (2), characterized by further containing, by mass %,
B: 0.0005 to 0.005%.

(4) Steel for machine structure use for surface hardening as set forth in any one of (1) to (3), characterized by further containing, by mass %, one or more of
Nb: 0.005 to 0.3%,
Ti: 0.005 to 0.2%,
Ni: 0.05 to 2.0%, and
Cu: 0.01 to 2.0%.

(5) Steel for machine structure use for surface hardening as set forth in any one of (1) to (4), characterized by further containing, by mass %, one or more of
Ca: 0.0005 to 0.01%,
Mg: 0.0005 to 0.01%,
Zr: 0.0005 to 0.05%, and
Te: 0.0005 to 0.1%.

(6) Steel for machine structure use for surface hardening as set forth in any one of (1) to (5), characterized in that said steel for machine structure use for surface hardening is steel which is nitrided, then induction hardened.

(7) Steel for machine structure use for surface hardening as set forth in (6) characterized in that said nitriding is soft nitriding.

(8) A steel part for machine structure use obtained by machining steel for machine structure use for surface hardening as set forth in any one of (1) to (7), nitriding it, then induction hardening it, said steel part for machine structure use characterized in that the surface layer from the surface down to a depth of 0.4 mm or more is a nitrided layer and the hardness of the nitrided layer from the surface down to a depth of 0.2 mm is a Vicker's hardness at the time of tempering at 300° C. of 650 or more.

(9) A steel part for machine structure use as set forth in (8), characterized in that said nitriding is soft nitriding.

(10) A steel part for machine structure use as set forth in (8) or (9), characterized in that said nitrided layer from the surface down to a depth of 5 μm or more includes pores of a circle equivalent diameter of 0.1 to 1 μm in an amount of 10000/mm² or more.

Advantageous Effects of Invention

According to the present invention, it is possible to provide steel for structural use for surface hardening able to be applied to power transmission parts of automobiles etc. and possible to provide steel parts having high contact fatigue strength, in particular, gears, continuously variable transmission, constant velocity joints, hubs, and other steel parts for machine structures.

DESCRIPTION OF EMBODIMENTS

Figure 1:
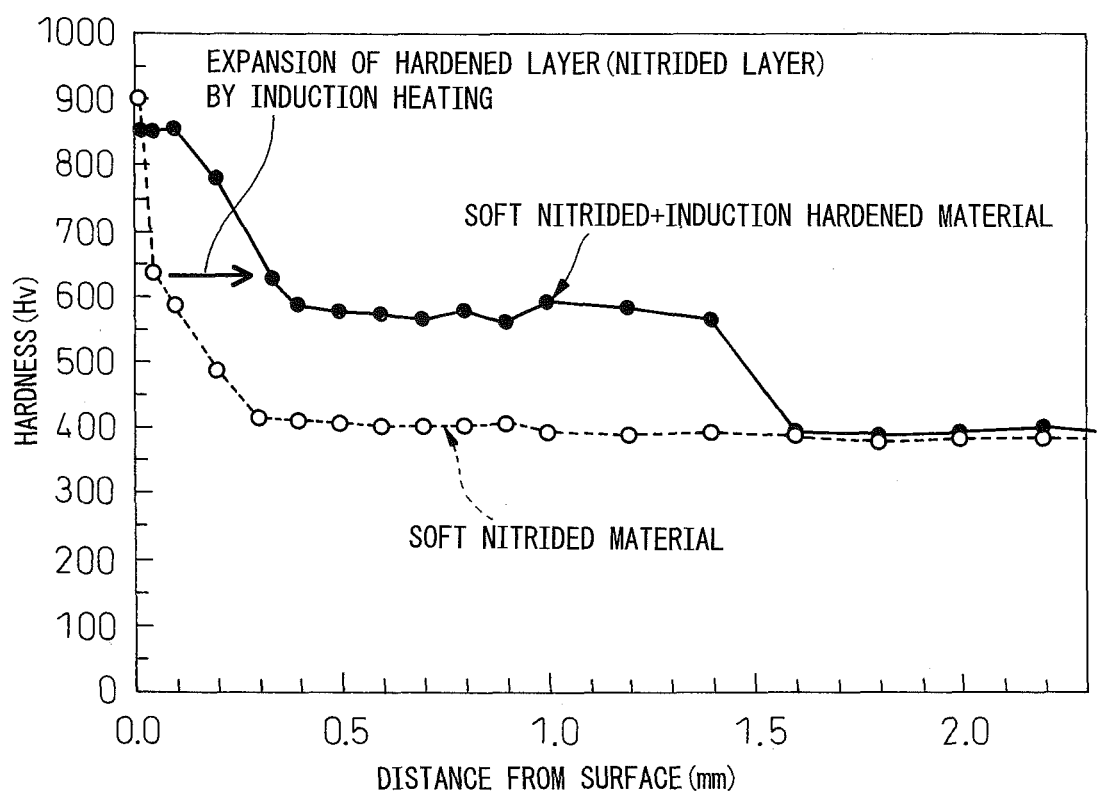
FIG. 1 is a view showing an example of the distribution of hardness in the cross-section from the surface in the direction of the core in a soft nitrided material and in a soft nitrided and induction hardened material.
Figure 2:
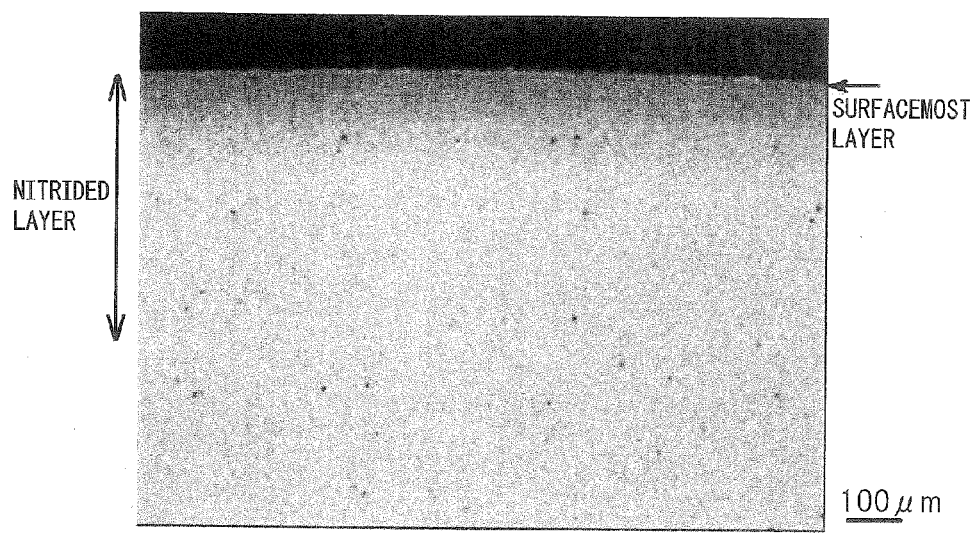
FIG. 2 are views showing an example of a nitrided layer when observed under an optical microscope and a scan type electron microscope. (a) shows a nitrided layer observed by an optical micrograph, while (b) shows a nitrided layer (layer part enlarged) observed by a scan type electron microscope.
Figure 2:

The present invention has as its basic idea to produce a steel part from which a high contact fatigue strength is demanded by nitriding or soft nitriding steel to which suitable amounts of Mn and W are added, then induction hardening it to deeply form a nitrided layer with a high N concentration and improve the hardness and softening resistance.

First, the reasons for defining the composition of ingredients forming the basis of the present invention will be explained. Here, the % means the mass %.

C: 0.3 to 0.6%

C is an important element for obtaining strength of the steel. In particular, it is an element required for reducing the ferrite percentage of the structure before induction hardening, improving the hardening ability at the time of induction hardening, and increasing the depth of the hardened layer.

If less than 0.3%, the ferrite percentage is high and the hardening at the time of induction hardening is insufficient, so the lower limit was made 0.3%. The preferable lower limit is 0.36%.

On the other hand, if too great, the machineability and forgeability at the time of fabrication of the steel part remarkably fall and, furthermore, the possibility of occurrence of quenching cracks at the time of induction hardening becomes greater, so the upper limit was made 0.6%. The preferable upper limit is 0.53%.

Si: 0.02 to 2.0%

Si is an element having the effect of raising the softening resistance of the quenched layer and increasing the contact fatigue strength. To obtain this effect, 0.02% or more has to be added. Preferably, 0.1% or more, more preferably 0.25% or more is added.

However, if over 2.0%, the decarburization at the time of forging becomes remarkable, so 2.0% was made the upper limit. The preferable upper limit was 1.44%.

Mn: 1.5 to 3.0%

Mn is an element effective for improving the quenchability and increasing the softening resistance and thereby raising the contact fatigue strength. Furthermore, Mn has the effect of immobilizing the S in the steel as MnS and suppressing the action of S in concentrating at the surface of the steel material to inhibit entry of N and of promoting the formation of a thick compound layer due to nitriding or soft nitriding.

To immobilize S as MnS to render it harmless, Mn has to be added to satisfy Mn/S≥70.

Further, Mn is an element having the effect of lowering the ferrite percentage of the structure before induction hardening and raising the hardening ability at the time of induction hardening. To obtain the effect of addition, 1.5% or more has to be added. Preferably, it is 1.55% or more, more preferably 1.6% or more.

However, if over 3.0%, when producing a steel material, it becomes too hard and the cuttability of steel bars etc. is obstructed. Furthermore, Mn segregates between dendrites at the solidification stage at the time of steelmaking and makes the steel material locally harden and become brittle, so 3.0% was made the upper limit. The preferable upper limit is 2.59%, while the more preferable upper limit is 2.29%.

S: 0.0001 to 0.025%

S is a soft nitriding inhibiting element which has the action of improving the machineability, but concentrating at the surface of the steel material and obstructing entry of N into the steel material at the time of soft nitriding.

If over 0.025%, the action of inhibiting nitriding becomes remarkable and, furthermore, the forgeability also remarkably degrades, so even if added for improving the machineability, it should be kept at 0.025% or less. Preferably, it is 0.019% or less, more preferably 0.009% or less. The lower limit was made the industrial limit of 0.0001%.

To immobilize the S in the steel as MnS and render it harmless, it is necessary that 3000≥Mn/S≥70.

Mn/S: 70 to 30000

As explained above, this prevents the S from concentrating at the surface of the steel material, so a certain ratio or more of Mn to the S has to be added to immobilize the S as MnS and render the S harmless.

If the ratio Mn/S of the amounts of addition of Mn and S is less than 70, S concentrates at the surface of the steel material and inhibits the formation of the compound layer at the time of nitriding or soft nitriding, so Mn/S was made 70 or more. If Mn/S is 70 or more, the effect of addition is remarkable.

The upper limit of Mn and the lower limit of S are set, so there is no particular need to set the upper limit of Mn/S, but when Mn/S≈30000, the effect of addition of Mn becomes saturated, so the upper limit was made 30000.

Figure 3:
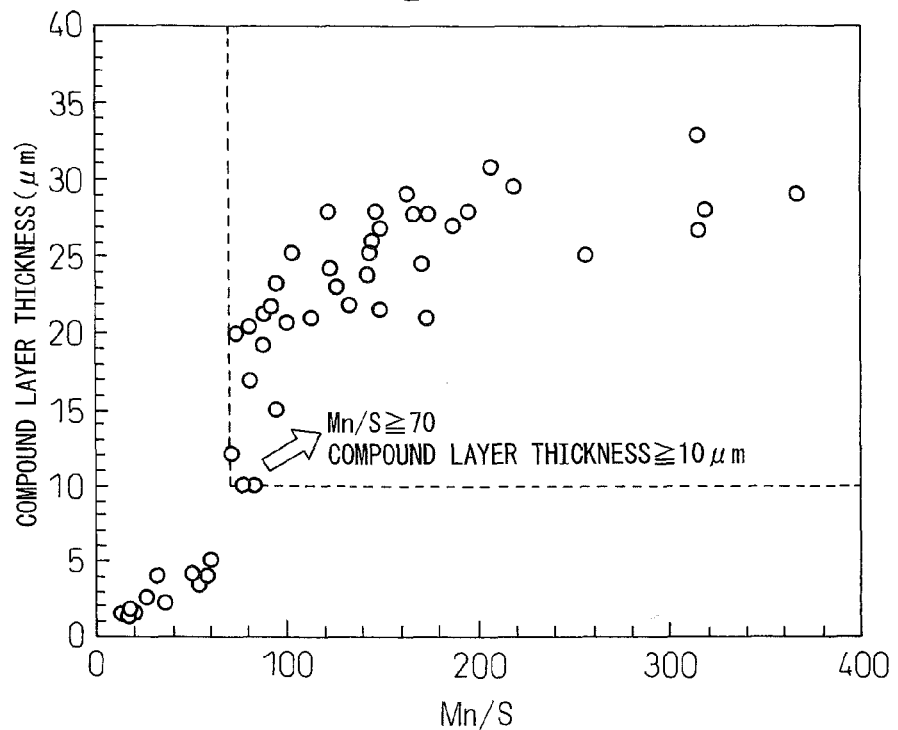
FIG. 3 is a view showing the relationship between the Mn/S and compound layer thickness (μm).

FIG. 3 is a view showing the relationship between the Mn/S obtained by soft nitriding the steel material under the later explained conditions and the thickness (μm) of the compound layer. From FIG. 3, it is understood that if making Mn/S 70 or more, at the time of soft nitriding, it is possible to obtain a compound layer of a thickness of 10 μm or more.

W: 0.0025 to 0.5%

W is an element with a good affinity with N and having the action of raising the quenchability and promoting the diffusion of N at the time of induction heating to raise the contact fatigue strength. Further, W is an element having the action of lowering the ferrite percentage of the structure before induction hardening and raising the hardening ability at the time of induction hardening.

Furthermore, W is an element which does not easily segregate in the steel and has the action of uniformly raising the quenchability of steel and thereby making up for the drop in the quenchability due to the segregation of Mn. To obtain the effect of addition of W, 0.0025% or more has to be added. Preferably, it is 0.01% or more, more preferably 0.05% or more.

Provided, however, if over 0.5%, the machineability deteriorates and, furthermore, the effect of addition is saturated and the economy is impaired, so 0.5% was made the upper limit. The preferable upper limit is 0.40%, more preferably 0.25%.

Al: 0.001 to 0.5%

Al precipitates and disperses as Al nitrides in the steel and effectively acts for refining the austenite structure at the time of induction hardening. Furthermore, it is an element having the action of raising the quenchability and increasing the depth of the hardened layer. Further, Al is an element effective for improvement of the machineability.

To obtain the effect of addition, 0.001% or more has to be added. Preferably, it is 0.005% or more, more preferably 0.010% or more.

However, if over 0.5% is added, the precipitate coarsens and the steel is made brittle, so the upper limit was made 0.5%. The preferable upper limit is 0.31%, more preferably 0.14%.

N: 0.003 to 0.02%

N is an element forming various types of nitrides and effectively acting to refine the austenite structure at the time of induction hardening. To obtain the effect of addition, 0.003% or more has to be added. Preferably, it is 0.005% or more.

However, if over 0.02% is added, the forgeability deteriorates, so 0.02% was made the upper limit. The preferable upper limit is 0.01%.

P: 0.0001 to 0.03%

P is an element segregating at the grain boundaries and acting to reduce the toughness. For this reason, it has to be reduced as much as possible. It is limited to 0.03% or less. Preferably, it is limited to 0.01% or less. The lower limit is made the industrial limit of 0.0001%.

O: 0.0001 to 0.0050%

O is present in the steel as $Al_2O_3$, $SiO_2$, and other oxide-based inclusions, but if O is too great, said oxides end up becoming large in size and form starting points leading to fracture of the power transmission parts, so has to be limited to 0.0050% or less.

The less, the better, so 0.0020% or less is preferable. Furthermore, when aiming at longer life, 0.0015% or less is preferable. The lower limit is the industrial limit of 0.0001%.

Next, the composition of ingredients of the optional elements of the present invention will be explained.

[Contact Fatigue Strength Improving Elements]

Cr: 0.01 to 2.0%

Cr is an element having the effect of raising the nitrided properties of the steel and of raising the softening resistance of the quenched layer to improve the contact pressure fatigue strength. To obtain the effect of addition, 0.01% or more is added. Preferably, it is 0.1% or more, more preferably 0.52% or more.

Provided, however, that if over 2.0% is added, the machineability deteriorates, so 2.0% was made the upper limit. The preferable upper limit is 1.74%, while the more preferable upper limit is 1.30%.

Mo: 0.01 to 1.0%

Mo is an element which has the effect of raising the softening resistance of the quenched layer to improve the contact fatigue strength and the effect or strengthening and toughening the quenched layer to improve the bending fatigue strength. To obtain the effect of addition, 0.01% or more has to be added. Preferably, it is 0.05% or more, more preferably 0.12% or more.

Provided, however, even if over 1.0% is added, the effect of addition becomes saturated and the economy is impaired, so 1.0% was made the upper limit. The preferable upper limit is 0.80%, the more preferable upper limit is 0.69%.

V: 0.01 to 1.0%

V is an element precipitating and dispersing as nitrides in the steel and effectively acting to refine the austenite structure at the time of induction hardening. To obtain the effect of addition, 0.01% or more has to be added. Preferably, it is 0.10% or more, more preferably 0.25% or more.

However, even if over 1.0% is added, the effect of addition becomes saturated and the economy is impaired, so the upper limit was made 1.0%. The preferable upper limit is 0.80%, the more preferable upper limit is 0.68%.

In the present invention, to raise the contact fatigue strength, one or more of Cr: 0.01 to 2.0%, Mo: 0.01 to 1.0%, and V: 0.01 to 1.0% are added.

[Quenchability Improving Elements]

B: 0.0005 to 0.005%

B is an element contributing to the improvement of the quenchability. To obtain the effect of addition, 0.0005% or more has to be added. Preferably, it is 0.001% or more. Provided, however, even if over 0.0050% is added, the effect of addition is saturated, so 0.005% was made the upper limit. The preferable upper limit is 0.003%.

[Steel Reinforcing Elements]

Nb: 0.005 to 0.3%

Nb is an element precipitating and dispersing as nitrides in the steel and effectively acting to refine the austenite structure at the time of induction hardening. To obtain the effect of addition, 0.005% or more has to be added. Preferably, it is 0.01% or more, more preferably 0.04% or more.

However, if over 0.3% is added, the effect of addition becomes saturated and the economy is impaired, so the upper limit was made 0.3%. The preferable upper limit is 0.2%, while the more preferable upper limit is 0.16%.

Ti: 0.005 to 0.2%

Ti is an element precipitating and dispersing as nitrides in the steel and effectively acting to refine the austenite structure at the time of induction hardening. To obtain the effect of addition, 0.005% or more has to be added. Preferably it is 0.02% or more, more preferably 0.05% or more.

However, if over 0.2% is added, the precipitate coarsens and the steel is made brittle, so the upper limit was made 0.2%. The preferable upper limit is 0.15%, the more preferable upper limit is 0.11%.

Ni: 0.05 to 2.0%

Ni is an element further improving the toughness. To obtain the effect of addition, 0.05% or more has to be added. Preferably, it is 0.10% or more, more preferably 0.21% or more.

However, if over 2.0% is added, the machineability deteriorates, so 2.0% was made the upper limit. The preferable upper limit is 1.5%, the more preferable upper limit is 0.96%.

Cu: 0.01 to 2.0%

Cu is an element strengthening ferrite and effective for improvement of the quenchability and improvement of the corrosion resistance. To obtain the effect of addition, 0.01% or more has to be added. Preferably, it is 0.09% or more, more preferably 0.14% or more.

However, even if over 2.0% is added, the effect of improvement of the mechanical properties becomes saturated, so 2.0% was made the upper limit. The preferable upper limit is 1.5%, while the more preferable upper limit is 0.95%. Note that, Cu particularly lowers the hot rollability and easily becomes a cause of flaws at the time of rolling, so is preferably added simultaneously with the Ni.

In the present invention, to reinforce the steel material, one or more of Nb: 0.005 to 0.3%, Ti: 0.005 to 0.2%, Ni: 0.05 to 2.0%, and Cu: 0.01 to 2.0% is added.

[Bending Strength Improving Elements]

When seeking an improvement of the bending fatigue strength at the steel part, one or more of Ca: 0.0005 to 0.01%, Mg: 0.0005 to 0.01%, Zr: 0.0005 to 0.05%, and Te: 0.0005 to 0.1% is added to the steel material.

The above elements are elements suppressing bending fatigue fracture of gears and fatigue fracture of the bottom of the splines of shaft parts caused by flattening of MnS and thereby further improving the bending fatigue strength.

To obtain the effect of addition, Ca: 0.0005% or more, Mg: 0.0005% or more, Zr: 0.0005% or more, or Te: 0.0005% or more has to be added. Preferably, Ca: 0.0010% or more, Mg: 0.0010% or more, Zr: 0.0010% or more, or Te: 0.0010% or more is added.

However, even if adding Ca: over 0.01%, Mg: over 0.01%, Zr: over 0.05%, and Te: over 0.1%, the effect of addition becomes saturated and the economy is impaired, so Ca: 0.01%, Mg: 0.01%, Zr: 0.05%, and Te: 0.1% were made the upper limits. The preferable upper limits are Ca: 0.005%, Mg: 0.005%, Zr: 0.005%, and Te: 0.07%.

That is, to obtain an MnS flattening suppressing effect, one or more of Ca: 0.0005 to 0.01%, Mg: 0.0005 to 0.01%, Zr: 0.0005 to 0.05%, and Te: 0.0005 to 0.1% may be added.

Further, in the present invention, in addition to the above elements, it is possible to include Pb, Bi, Sn, Zn, REM, and Sb to an extent not impairing the effect of the present invention.

Next, the thickness and hardness of the nitrided layer at the surface layer of a steel part will be explained.

The steel part of the present invention is a steel part obtained by machining steel of the present invention, nitriding or soft nitriding it, then induction hardening it, characterized in that the surface layer from the surface down to a depth of 0.4 mm or more is a nitrided layer and the hardness of the nitrided layer from the surface down to a depth of 0.2 mm is a Vicker's hardness at the time of tempering at 300° C. of 650 or more.

If the nitrided layer has a thickness of less than 0.4 mm, the surface layer having a sufficient hardness becomes thinner. Before fracture of a surface starting point occurs, internal fracture, that is, "spalling", occurs and the lifetime becomes short, so the surface layer from the surface down to a depth of 0.4 mm or more is designated as the "nitrided layer".

Contact fatigue fracture is fracture of a surface starting point formed at a sliding surface raised in temperature (to around 300° C.), so maintaining the high temperature strength, that is, increasing the temper softening resistance, is effective for improving the contact fatigue strength.

In the nitrided layer of a depth from the surface of 0.2 mm, if the Vicker's hardness when tempering at 300° C. is less than 650, the nitrided layer cannot withstand a high contact pressure, so at the nitrided layer from the surface down to a depth of 0.2 mm, the Vicker's hardness when tempering at 300° C. is made 650 or more.

At an actual steel part, whether it is a steel part obtained by soft nitriding, then induction hardening can be judged by (a) the distribution of structures observed under an optical microscope after obtaining a micro sample from the steel part and corroding it by a Nital corrosive solution, (b) the distribution of hardness measured from the surface to the core, and, furthermore, (c) the N concentration from the surface to the core measured by EPMA.

To form a nitrided layer with a high N concentration to obtain a high contact fatigue strength, it is necessary to form a compound layer breaking down and supplying N at the time of high frequency heat treatment (layer mainly comprised of $Fe_3N$, $Fe_4N$, or other Fe nitrides) at the steel surface. For this reason, the nitriding or soft nitriding is necessary and important treatment.

To make a sufficient amount of N diffuse in the steel, make the surface layer of the steel hard, and deeply form a nitrided layer with a high temper softening resistance, it is necessary to make the thickness of the compound layer after nitriding or soft nitriding 10 μm or more.

If soft nitriding at a high temperature of over 600° C., the compound layer becomes thin and, furthermore, the N concentration in the compound layer becomes lower, so the soft nitriding temperature is made less than 600° C. If the soft nitriding temperature is a low temperature, it is possible to prevent heat treatment deformation, grain boundary oxidation, etc. of the steel material, so from this point as well, the soft nitriding temperature is made less than 600° C.

To form a thick compound layer, the soft nitriding temperature is preferably 500° C. or more. The depth of the nitrided layer reaches the saturated state even if soft nitriding for a long time, so the soft nitriding time is preferably 1 to 3 hours.

The cooling after the soft nitriding may be performed by any method of air cooling, $N_2$ gas cooling, oil cooling, etc. As the soft nitriding, gas soft nitriding or salt bath soft nitriding may be used.

As the method for supplying nitrogen to the surface of the steel material and forming a 10 μm or more compound layer at the surface layer of the steel material, not only soft nitriding, but also nitriding may be used. The "nitriding" referred to here is not a method, like soft nitriding, of treatment in a mixed atmosphere of $NH_3$ and $CO_2$ (and sometimes also $N_2$), but a surface hardening method of treatment by $NH_3$ for a long time and is an industrially different method.

To break down the compound layer formed at the surface of the steel material by soft nitriding and, furthermore, make the N diffuse in the steel to form a nitrided layer with a high N concentration deep from the surface down to a depth of 0.4 mm or more and obtain a high hardness of a Vicker's hardness at the time of quenching at 300° C. of 650 or more at the nitrided layer from the surface down to a depth of 0.2 mm, it is necessary to soft nitride, then induction heat the steel to heat it to the austenite region and quench it.

The heating conditions at the time of the induction hardening have to be set considering the breakdown of the compound layer. The heating temperature has to be made the austenization temperature to less than 900° C. and the holding time 0.05 to 5 seconds.

Figure 4:
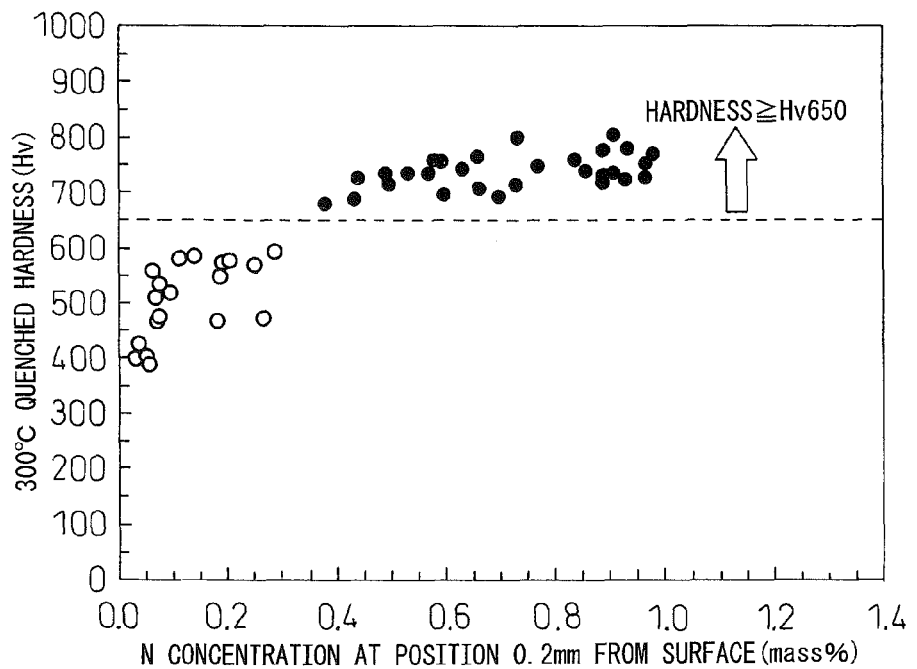
FIG. 4 is a view showing the relationship between the N concentration (mass %) at a position of 0.2 mm from the surface layer after induction hardening and the 300° C. tempered hardness (Hv).

Here, FIG. 4 shows the relationship of the N concentration at a position 0.2 mm from the surface after induction hardening and the Vicker's hardness at the time of tempering at 300° C. From FIG. 4, it will be understood that to make the Vicker's hardness 650 or more, the N concentration has to be made 0.35% or more.

If the heating temperature is 900° C. or more, N unnecessarily diffuses to the inside and the N concentration at the nitrided layer from the surface down to 0.2 mm required for improvement of the contact fatigue strength becomes less than 0.35%.

As a result, the Vicker's hardness when tempering at 300° C. becomes less than 650 and, furthermore, the increase in the oxide layer causes deterioration of the mechanical properties. If the heating temperature is less than the austenization temperature, martensite transformation does not occur and a high surface hardness cannot be obtained.

If the holding time is less than 0.05 second, the breakdown of the compound layer and diffusion of the N produced become insufficient. On the other hand, if over 5 seconds, N is unnecessarily diffused inward and the N concentration at the nitrided layer from the surface down to 0.2 mm required for improvement of the contact fatigue strength becomes less than 0.35%.

As a result, the Vicker's hardness when tempering at 300° C. becomes less than 650.

The frequency of the induction is around 400 kHz if a small sized steel part and around 5 kHz if a large sized steel part.

The coolant used for the quenching is preferably water, a polymer quenching agent, or other water-based one with a large cooling ability. After induction hardening, usually it is preferable to temper the steel part at a low temperature of around 150° C. based on a carburized quenched part so as to secure the toughness of the part.

Next, the surface layer structure of a steel part will be explained.

The steel part of the present invention is a steel part obtained by soft nitriding, then induction hardening, characterized in that a surface layer from the surface down to a depth of 5 μm or more includes pores of a circle equivalent diameter of 0.1 to 1 μm in an amount of 10000/mm² or more.

At a steel member such as a gear which fractures due to contact fatigue due to rolling, lubrication of the operating surfaces is important. If the lubrication is insufficient, the steel materials will contact each other, seizing and sticking will occur, and the contact fatigue strength falls.

To form a lubricating film giving sufficient lubrication, it is effective to provide oil reservoirs so that a lubricant oil film is formed without break on the operating surfaces. The present invention is characterized by soft nitriding the surface layer of the steel material to form a compound layer mainly comprised of $Fe_3N$, $Fe_4N$, and Fe nitrides, then induction heating it to austenize and quench it to form a nitrided layer.

The nitrided layer is formed by the breakdown of the compound layer, but at this time, the N in the compound layer diffuses inside to form a nitrided layer and the old compound layer becomes a hard porous layer in which a large number of pores are dispersed. These pores function as oil reservoirs resulting in an improvement in the lubricating effect and a greater improvement in the wear resistance and durability. This is a discovery which the inventors learned as a result of intensive research.

The fact that if pores of a circle equivalent diameter of 0.1 to 1 μm are present in an amount of 10000/mm² or more in a nitrided layer from surface down to 5 μm or more in depth, they effectively function as oil reservoirs was discovered by the inventors after intensive research.

To ensure that the size and distribution of the pores fall in the required range, the soft nitriding conditions and induction heating conditions have to be suitably controlled. The compound layer formed by the soft nitriding also has some pores, so an oil reservoir effect is expressed, but said compound layer is extremely fragile and cannot withstand a large load, so a high contact fatigue strength cannot be obtained.

If the pores are coarse, the surface roughness deteriorates and becomes the starting points of pitching and contact fatigue and therefore inhibits the contact fatigue strength, so the size of the pores was limited to a circle equivalent diameter of 1 μm or less. On the other hand, if the pores are too small, the pores do not sufficiently function as oil reservoirs, so the size of the pores has to be a circle equivalent diameter of 0.1 μm or more.

If the number of pores is too small, the pores do not effectively function as oil reservoirs, so there have to be 10000/mm² or more at the nitrided layer from the surface down to 5 μm or more in depth.

The gear faces of gears and other sliding members, in normal operation, are worn down by 5 μm or more before the end of their lifetime, so it is necessary that there be pores in the amount of 10000/mm² or more at the surface down to a depth of 5 μm or more. If the pores are large in size, the density depends on the soft nitriding conditions and induction heating conditions.

To make the nitrided layer and effective porous layer, heat treatment under soft nitriding conditions and induction hardening conditions enabling a high contact fatigue strength to be obtained is essential. Preferably, soft nitriding is performed at 580° C. to less than 600° C., then induction heating is performed at 880° C. to less than 900° C. for 1 second to 4 seconds.

The structure of the steel member has to be made one with a surface layer of martensite and a core remaining as a ferrite-pearlite structure. If quenching only the surface layer to cause martensite transformation and giving the surface layer compressive residual stress, the contact fatigue strength is improved. If the core as well is made to transform to martensite, the surface layer falls in compressive residual stress and the contact fatigue strength falls.

EXAMPLES

Next, examples of the present invention will be explained, but the conditions of the examples are illustrations of the conditions employed for confirming the workability and effect of the present invention. The present invention is not limited to these illustrations of conditions. The present invention may employ various conditions so long as not deviating from the gist of the present invention and achieving the object of the present invention.

Examples

Various steel materials with the chemical compositions shown in Table 1 and Table 2 (continuation of Table 1) were forged, then annealed, then machined to fabricate test pieces for use for roller pitching fatigue tests, that is, (a) small roller test pieces having cylindrical parts of diameters of 26 mm and widths of 28 mm and (b) large roller test piece having cylindrical parts of diameters of 130 mm and widths of 18 mm.

Furthermore, test pieces of a diameter of 26 mm and a length of 100 mm were fabricated for use for hardness tests for investigating the softening resistance by tempering.

TABLE 1

| Example | Class | Chemical composition (mass %) | | | | | | | | | | | |
|---|---|---|---|---|---|---|---|---|---|---|---|---|---|
| | | C | Si | Mn | P | S | Cr | Mo | W | V | Al | O | N |
| 1 | Inv. ex. | 0.31 | 0.70 | 2.12 | 0.025 | 0.013 | 1.23 | 0.79 | 0.39 | 0.28 | 0.051 | 0.002 | 0.003 |
| 2 | Inv. ex. | 0.39 | 0.60 | 1.92 | 0.028 | 0.009 | 1.51 | 0.58 | 0.31 | 0.37 | 0.038 | 0.001 | 0.018 |
| 3 | Inv. ex. | 0.43 | 0.78 | 2.39 | 0.015 | 0.009 | 0.68 | 0.15 | 0.07 | 0.40 | 0.083 | 0.001 | 0.019 |
| 4 | Inv. ex. | 0.48 | 0.53 | 1.98 | 0.012 | 0.021 | 1.66 | 0.12 | 0.07 | 0.08 | 0.077 | 0.005 | 0.004 |
| 5 | Inv. ex. | 0.50 | 1.13 | 1.81 | 0.014 | 0.018 | 0.67 | 0.76 | 0.32 | 0.68 | 0.160 | 0.002 | 0.014 |
| 6 | Inv. ex. | 0.53 | 1.39 | 2.54 | 0.017 | 0.014 | 1.41 | 0.80 | 0.10 | 0.31 | 0.098 | 0.001 | 0.005 |
| 7 | Inv. ex. | 0.54 | 0.92 | 2.00 | 0.024 | 0.016 | 1.43 | 0.59 | 0.12 | 0.36 | 0.130 | 0.003 | 0.005 |
| 8 | Inv. ex. | 0.55 | 1.25 | 1.75 | 0.025 | 0.014 | 1.89 | 0.69 | 0.06 | 0.49 | 0.101 | 0.001 | 0.018 |
| 9 | Inv. ex. | 0.56 | 0.41 | 1.55 | 0.010 | 0.017 | 2.00 | 0.66 | 0.15 | 0.56 | 0.075 | 0.002 | 0.018 |
| 10 | Inv. ex. | 0.58 | 0.50 | 2.18 | 0.017 | 0.007 | 0.95 | 0.57 | 0.17 | 0.43 | 0.171 | 0.003 | 0.015 |
| 11 | Inv. ex. | 0.50 | 1.12 | 2.23 | 0.019 | 0.025 | 0.82 | 0.63 | 0.07 | 0.67 | 0.098 | 0.005 | 0.004 |
| 12 | Inv. ex. | 0.55 | 1.44 | 1.62 | 0.015 | 0.011 | 1.61 | 0.79 | 0.25 | 0.43 | 0.022 | 0.002 | 0.006 |
| 13 | Inv. ex. | 0.47 | 1.05 | 2.36 | 0.024 | 0.014 | 1.30 | 0.42 | 0.18 | 0.25 | 0.039 | 0.003 | 0.004 |
| 14 | Inv. ex. | 0.49 | 0.76 | 1.60 | 0.025 | 0.021 | 1.24 | 0.17 | 0.40 | 0.59 | 0.021 | 0.001 | 0.004 |
| 15 | Inv. ex. | 0.43 | 1.03 | 2.38 | 0.027 | 0.016 | 1.93 | 0.21 | 0.25 | 0.29 | 0.081 | 0.001 | 0.009 |

TABLE 1-continued

| | | C | Si | Mn | P | S | Cr | Mo | W | V | Al | O | N |
|---|---|---|---|---|---|---|---|---|---|---|---|---|---|
| 16 | Inv. ex. | 0.48 | 0.41 | 2.05 | 0.016 | 0.006 | 1.09 | 0.42 | | 0.34 | 0.53 | 0.012 | 0.003 | 0.006 |
| 17 | Inv. ex. | 0.36 | 0.31 | 1.55 | 0.025 | 0.019 | 0.54 | 0.23 | | 0.27 | 0.30 | 0.029 | 0.004 | 0.005 |
| 18 | Inv. ex. | 0.42 | 1.13 | 1.87 | 0.016 | 0.006 | 0.60 | 0.51 | | 0.38 | 0.51 | 0.136 | 0.003 | 0.004 |
| 19 | Inv. ex. | 0.45 | 0.51 | 2.29 | 0.028 | 0.016 | 1.84 | 0.12 | | 0.14 | 0.44 | 0.014 | 0.002 | 0.003 |
| 20 | Inv. ex. | 0.58 | 0.43 | 2.07 | 0.010 | 0.022 | 0.61 | 0.15 | | 0.25 | 0.22 | 0.099 | 0.002 | 0.010 |
| 21 | Inv. ex. | 0.35 | 1.35 | 1.70 | 0.016 | 0.012 | 0.70 | 0.77 | | 0.40 | 0.07 | 0.081 | 0.005 | 0.008 |
| 22 | Inv. ex. | 0.52 | 1.06 | 2.12 | 0.026 | 0.016 | 1.60 | 0.05 | | 0.30 | 0.12 | 0.034 | 0.004 | 0.007 |
| 23 | Inv. ex. | 0.49 | 1.60 | 1.76 | 0.020 | 0.008 | 1.74 | 0.38 | | 0.12 | 0.55 | 0.080 | 0.004 | 0.005 |
| 24 | Inv. ex. | 0.42 | 0.26 | 2.27 | 0.014 | 0.007 | 1.63 | 0.69 | | 0.05 | 0.25 | 0.291 | 0.005 | 0.003 |
| 25 | Inv. ex. | 0.47 | 0.79 | 2.59 | 0.017 | 0.013 | 1.22 | 0.05 | | 0.13 | 0.22 | 0.130 | 0.002 | 0.004 |

| | Chemical composition (mass %) | | | | | | | | |
|---|---|---|---|---|---|---|---|---|---|
| Example | B | Nb | Ti | Ni | Cu | Ca | Mg | Zr | Te | Mn/S |
| 1 | | | | | | | | | | 167 |
| 2 | | | | | | | | | | 220 |
| 3 | | | | | | | | | | 257 |
| 4 | | | | | | | | | | 95 |
| 5 | | | | | | | | | | 101 |
| 6 | | | | | | | | | | 176 |
| 7 | | | | | | | | | | 125 |
| 8 | | | | | | | | | | 127 |
| 9 | | | | | | | | | | 89 |
| 10 | | | | | | | | | | 319 |
| 11 | 0.003 | | | | | | | | | 90 |
| 12 | 0.005 | | 0.02 | | | | | | | 150 |
| 13 | | 0.09 | 0.06 | | | | | | | 172 |
| 14 | | | | 0.68 | 0.15 | | | | | 76 |
| 15 | 0.001 | | | 0.22 | 0.79 | | | | | 151 |
| 16 | | | 0.05 | 0.12 | 0.95 | | | | | 367 |
| 17 | 0.003 | 0.16 | | | | | | | | 82 |
| 18 | 0.003 | 0.04 | 0.11 | 0.21 | 0.57 | | | | | 315 |
| 19 | 0.001 | | | | | 0.0025 | | | | 145 |
| 20 | | | | 0.66 | 0.48 | | 0.0014 | | | 94 |
| 21 | | | | | | | | 0.0016 | | 144 |
| 22 | 0.001 | | 0.10 | 0.80 | 0.75 | | | | 0.065 | 134 |
| 23 | 0.002 | | | 0.48 | 0.11 | 0.0019 | 0.0044 | | | 209 |
| 24 | | 0.12 | 0.14 | | | | 0.0020 | 0.0046 | | 316 |
| 25 | 0.004 | 0.05 | 0.08 | 0.96 | 0.09 | 0.0005 | 0.0007 | 0.0027 | 0.010 | 196 |

TABLE 2

| | | Chemical composition (mass %) | | | | | | | | | | | |
|---|---|---|---|---|---|---|---|---|---|---|---|---|---|
| Example | Class | C | Si | Mn | P | S | Cr | Mo | W | V | Al | O | N |
| 26 | Inv. ex. | 0.41 | 0.50 | 1.62 | 0.015 | 0.009 | 0.68 | 0.15 | | 0.07 | 0.40 | 0.083 | 0.001 | 0.005 |
| 27 | Inv. ex. | 0.45 | 0.49 | 1.63 | 0.011 | 0.011 | 0.52 | 0.01 | | 0.06 | 0.10 | 0.093 | 0.001 | 0.004 |
| 28 | Inv. ex. | 0.53 | 0.70 | 1.65 | 0.012 | 0.010 | 1.10 | 0.07 | | 0.06 | 0.10 | 0.025 | 0.002 | 0.006 |
| 29 | Inv. ex. | 0.50 | 0.64 | 1.60 | 0.013 | 0.013 | 0.95 | 0.09 | | 0.06 | 0.11 | 0.036 | 0.001 | 0.004 |
| 30 | Inv. ex. | 0.45 | 0.32 | 1.75 | 0.009 | 0.012 | 0.85 | 0.11 | | 0.07 | 0.12 | 0.025 | 0.001 | 0.004 |
| 31 | Inv. ex. | 0.42 | 0.25 | 1.89 | 0.012 | 0.010 | 0.94 | 0.05 | | 0.12 | 0.13 | 0.026 | 0.002 | 0.004 |
| 32 | Comp. ex. | 0.15 | 0.83 | 1.54 | 0.022 | 0.016 | 0.82 | 1.01 | | 0.38 | 0.31 | 0.267 | 0.002 | 0.028 |
| 33 | Comp. ex. | 0.44 | 1.33 | 0.51 | 0.015 | 0.025 | 0.51 | 1.43 | | 0.12 | 0.12 | 0.074 | 0.002 | 0.026 |
| 34 | Comp. ex. | 0.44 | 0.03 | 0.80 | 0.027 | 0.055 | 1.60 | 1.25 | | 0.12 | 0.11 | 0.055 | 0.001 | 0.013 |
| 35 | Comp. ex. | 0.52 | 0.01 | 0.92 | 0.010 | 0.011 | 1.52 | | | | 0.06 | 0.600 | 0.002 | 0.021 |
| 36 | Comp. ex. | 0.21 | 0.50 | 1.52 | 0.012 | 0.025 | 0.69 | 0.16 | | | 0.35 | 0.094 | 0.002 | 0.021 |
| 37 | Comp. ex. | 0.55 | 0.28 | 0.81 | 0.010 | 0.025 | 0.60 | 0.11 | | | 0.37 | 0.020 | 0.005 | 0.009 |
| 38 | Comp. ex. | 0.55 | 0.28 | 1.75 | 0.010 | 0.100 | 0.60 | 0.11 | | | 0.23 | 0.020 | 0.004 | 0.005 |
| 39 | Comp. ex. | 0.35 | 0.80 | 1.65 | 0.013 | 0.023 | 0.80 | 0.47 | 0.03 | 0.33 | 0.029 | 0.001 | 0.027 |
| 40 | Comp. ex. | 0.40 | 1.32 | 1.68 | 0.018 | 0.016 | 1.89 | 0.41 | | 0.12 | 0.39 | 0.017 | 0.002 | 0.014 |
| 41 | Comp. ex. | 0.44 | 1.26 | 1.68 | 0.029 | 0.021 | 0.91 | 0.12 | 0.07 | 0.15 | 0.013 | 0.003 | 0.013 |
| 42 | Comp. ex. | 0.45 | 1.19 | 2.00 | 0.014 | 0.017 | 0.72 | 0.48 | | 0.05 | 0.31 | 0.025 | 0.003 | 0.020 |
| 43 | Comp. ex. | 0.47 | 0.72 | 1.69 | 0.023 | 0.022 | 1.34 | 0.43 | 0.02 | 0.22 | 0.026 | 0.004 | 0.014 |
| 44 | Comp. ex. | 0.55 | 0.45 | 1.89 | 0.021 | 0.018 | 1.52 | 0.25 | 0.03 | 0.15 | 0.052 | 0.003 | 0.012 |
| 45 | Comp. ex. | 0.44 | 0.86 | 0.58 | 0.022 | 0.024 | 0.54 | 0.09 | | 0.30 | 0.027 | 0.002 | 0.003 |
| 46 | Comp. ex. | 0.45 | 0.25 | 0.55 | 0.005 | 0.015 | 0.50 | 0.60 | | 0.50 | 0.030 | 0.001 | 0.006 |
| 47 | Comp. ex. | 0.55 | 0.25 | 0.35 | 0.005 | 0.013 | 0.51 | 0.61 | | 0.49 | 0.029 | 0.001 | 0.006 |
| 48 | Comp. ex. | 0.55 | 0.25 | 0.55 | 0.003 | 0.010 | 2.90 | 0.61 | | 0.51 | 0.033 | 0.001 | 0.006 |
| 49 | Comp. ex. | 0.54 | 0.12 | 0.79 | 0.009 | 0.010 | 0.30 | | | | 0.020 | 0.001 | 0.006 |
| 50 | Comp. ex. | 0.55 | 0.10 | 0.41 | 0.009 | 0.022 | 1.01 | 0.05 | | 0.10 | 0.440 | 0.001 | 0.006 |
| 51 | Comp. ex. | 0.58 | 1.00 | 0.51 | 0.008 | 0.010 | 0.98 | | | 0.30 | 0.100 | 0.001 | 0.006 |
| 52 | Comp. ex. | 0.20 | 0.25 | 1.00 | 0.010 | 0.017 | 0.90 | | | 0.50 | 0.015 | 0.001 | 0.006 |
| 53 | Comp. ex. | 0.40 | 0.50 | 1.20 | 0.009 | 0.013 | 2.00 | | | | 0.015 | 0.001 | 0.006 |

TABLE 2-continued

| | Chemical composition (mass %) | | | | | | | | | |
|---|---|---|---|---|---|---|---|---|---|---|
| Example | B | Nb | Ti | Ni | Cu | Ca | Mg | Zr | Te | Mn/S |
| 26 | | | | | | | | | | 174 |
| 27 | | | | | | | | | | 148 |
| 28 | 0.001 | | 0.02 | | | | | | | 165 |
| 29 | | | | 0.62 | 0.14 | | | | | 123 |
| 30 | 0.001 | | 0.02 | 0.25 | 0.11 | | | | | 146 |
| 31 | 0.002 | 0.06 | 0.04 | 0.36 | 0.09 | 0.0005 | 0.0006 | 0.0026 | 0.010 | 189 |
| 32 | | | | | | | | | | 96 |
| 33 | | | | | | | | | | 20 |
| 34 | | | | | | | | | | 15 |
| 35 | | | | | | | | | | 84 |
| 36 | 0.002 | | | | | | | | | 61 |
| 37 | | | | | | | | | | 32 |
| 38 | | | | | | | | | | 18 |
| 39 | 0.002 | | | | | | | | 0.050 | 72 |
| 40 | | | | | | | | | | 105 |
| 41 | | 0.03 | | | | | | | | 81 |
| 42 | 0.002 | | | | | | | | | 115 |
| 43 | | | | | | | | 0.0020 | | 77 |
| 44 | | | | | | | | | | 105 |
| 45 | | | | 0.10 | | | | | | 24 |
| 46 | | | 0.0016 | | | | | | | 37 |
| 47 | | | 0.0017 | | | | | | | 27 |
| 48 | | | 0.0019 | | | | | | | 55 |
| 49 | | | | | | | | | | 79 |
| 50 | | | | | | | | | | 19 |
| 51 | | | | | | | | | | 51 |
| 52 | | | 0.50 | | | | | | | 59 |
| 53 | | | | | | | | | | 92 |

The small roller test pieces and large roller test pieces were soft nitrided (nitrided in $N_2$ (0.45 $Nm^3$/h)+$NH_3$ (0.5 $Nm^3$/h)+$CO_2$ (0.05 $Nm^3$/h) atmosphere at a predetermined temperature for 2 hours and cooled in $N_2$ gas), then induction hardened (frequency 100 kHz).

For the coolant at the time of induction hardening, tap water or a polymer quenching agent was used. After this, the pieces were tempered at 150° C. for 60 minutes for use for the fatigue test.

The test pieces of the large rollers and small rollers were used for a standard contact fatigue test, that is, roller pitching fatigue test. The roller pitching fatigue test was conducted by applying various Hertz stresses (contact pressures) to the small rollers and pushing the large rollers, making the rotating directions of the two test pieces the same at the contact parts, and making the slip rate −40% (at the contact parts, the peripheral speeds of the large rollers being 40% larger than the peripheral speeds of the small roller test pieces).

The oil temperature of the gear oil fed to the above contact parts was made 90° C. The test was usually ended at 10,000,000× ($10^7$×) showing the fatigue limit of steel. The maximum Hertz stress where pitching did not occur at the small roller and a speed of 10,000,000 was reached was made the fatigue limit of the small roller.

The occurrence of pitching was detected by a vibration meter attached to the tester. After detecting vibration, the two rollers were stopped from rotating and the occurrence of pitching and the speed were confirmed.

The test pieces for measurement of hardness were soft nitrided and induction hardened under the same conditions as the case of the small roller test pieces and large roller test pieces. After this, the pieces were quenched at 300° C. for 60 minutes and cut. The cut cross-sections were measured for the distribution of hardness from the surfaces to the cores by a Vicker's hardness meter. Note that the quenched surface layer structure was martensite and the non-quenched core remained a ferrite-pearlite structure.

Further, the N concentration at a position 0.2 m from the surface was measured by EPMA.

The density of pores of a circle equivalent diameter of 0.1 to 1 μm was found by taking test pieces soft nitrided and induction hardened under the same conditions as the small roller test pieces and large roller test pieces, cutting them at surfaces perpendicular to the rolling direction, embedding these in a resin, mirror polishing them, and quantifying the resultant surface layer structures by image processing.

The measurement was performed by a power of 3000× for a field of 50 μm² for 40 fields. The measurement value was converted to the number of pores per mm² to calculate the density.

The test results are shown in Table 3 and Table 4 (continuation of Table 3)

TABLE 3

| | | Soft nitriding | | Induction heating conditions | | After induction hardening | | | | | |
| | | | | | | | Position 0.2 mm from surface | | | | |
| | | | | | | Nitrided | | | | Fatigue test | |
| | | Temp. | Compound layer thickness | Temp. | Time | layer thick. | N conc. | 300° C. tempered | Pore density | maximum hertz stress | |
| Example | Class | (° C.) | μm | (° C.) | (second) | mm | (%) | hardness | (/mm²) | (MPa) | Remarks |
|---|---|---|---|---|---|---|---|---|---|---|---|
| 1 | Inv. ex. | 552 | 28 | 897 | 1.6 | 0.48 | 0.89 | 726 | 8119 | 3800 | |
| 2 | Inv. ex. | 582 | 30 | 877 | 2.5 | 0.45 | 0.97 | 725 | 5930 | 3800 | |
| 3 | Inv. ex. | 582 | 25 | 898 | 1.5 | 0.42 | 0.64 | 740 | 57209 | 4000 | |
| 4 | Inv. ex. | 566 | 23 | 837 | 4.2 | 0.41 | 0.54 | 730 | 2424 | 3800 | |
| 5 | Inv. ex. | 575 | 21 | 894 | 2.9 | 0.45 | 0.86 | 733 | 7799 | 3800 | |
| 6 | Inv. ex. | 579 | 28 | 846 | 1.4 | 0.42 | 0.60 | 693 | 1491 | 3800 | |
| 7 | Inv. ex. | 583 | 24 | 881 | 4.9 | 0.42 | 0.70 | 690 | 8731 | 3800 | |
| 8 | Inv. ex. | 577 | 23 | 832 | 4.4 | 0.41 | 0.38 | 679 | 2661 | 3800 | |
| 9 | Inv. ex. | 590 | 19 | 854 | 4.9 | 0.42 | 0.67 | 704 | 8603 | 3800 | |
| 10 | Inv. ex. | 555 | 28 | 868 | 4.2 | 0.43 | 0.84 | 758 | 2485 | 3800 | |
| 11 | Inv. ex. | 553 | 21 | 893 | 2.4 | 0.41 | 0.44 | 684 | 6117 | 3800 | B addition |
| 12 | Inv. ex. | 598 | 27 | 898 | 3.0 | 0.44 | 0.97 | 750 | 41245 | 4000 | B, Ti addition |
| 13 | Inv. ex. | 552 | 25 | 861 | 0.08 | 0.44 | 0.93 | 718 | 2375 | 3800 | Nb, Ti addition |
| 14 | Inv. ex. | 587 | 20 | 859 | 3.2 | 0.45 | 0.91 | 798 | 5635 | 3800 | Ni, Cu addition |
| 15 | Inv. ex. | 588 | 22 | 801 | 2.4 | 0.44 | 0.94 | 778 | 7704 | 3800 | B, Ni, Cu addition |
| 16 | Inv. ex. | 595 | 29 | 855 | 3.4 | 0.52 | 0.73 | 794 | 6120 | 3800 | Ti, Ni, Cu addition |
| 17 | Inv. ex. | 570 | 17 | 885 | 2.2 | 0.44 | 0.89 | 774 | 8915 | 3800 | B, Nb addition |
| 18 | Inv. ex. | 565 | 33 | 826 | 2.6 | 0.48 | 0.91 | 734 | 2607 | 3800 | B, Nb, Ti, Ni, Cu addition |
| 19 | Inv. ex. | 569 | 25 | 893 | 4.5 | 0.43 | 0.77 | 747 | 6110 | 3800 | B, Ca addition |
| 20 | Inv. ex. | 583 | 22 | 898 | 1.1 | 0.43 | 0.98 | 768 | 82387 | 4000 | Ni, Cu, Mg addition |
| 21 | Inv. ex. | 590 | 24 | 882 | 4.4 | 0.47 | 0.97 | 750 | 8516 | 3800 | Zr addition |
| 22 | Inv. ex. | 571 | 22 | 881 | 2.5 | 0.46 | 0.89 | 716 | 6656 | 3800 | B, Ti, Ni, Cu, Te addition |
| 23 | Inv. ex. | 580 | 31 | 872 | 4.5 | 0.44 | 0.89 | 720 | 2130 | 3800 | B, Ni, Cu, Ca, Mg addition |
| 24 | Inv. ex. | 574 | 27 | 898 | 0.5 | 0.42 | 0.58 | 755 | 5916 | 3800 | Nb, Ti, Mg, Zr addition |
| 25 | Inv. ex. | 588 | 28 | 822 | 3.2 | 0.42 | 0.73 | 714 | 7884 | 3800 | B, Nb, Ti, Ni, Cu, Ca, Mg, Zr, Te addition |

TABLE 4

| | | Soft nitridation | | Induction heating conditions | | After induction hardening | | | |
| | | | | | | | Position 0.2 mm from surface | | |
| | | | Compound | | | Nitrided | | | |
| | | Temp. | layer thick. | Temp. | Time | layer thick. | N conc. | 300° C. temper | Pore density |
| Example | Class | (° C.) | μm | (° C.) | (sec) | mm | (%) | hardness | (/mm²) |
|---|---|---|---|---|---|---|---|---|---|
| 26 | Inv. ex. | 593 | 21 | 895 | 1.3 | 0.41 | 0.49 | 731 | 70083 |
| 27 | Inv. ex. | 591 | 28 | 893 | 1.9 | 0.46 | 0.44 | 723 | 79563 |
| 28 | Inv. ex. | 591 | 29 | 891 | 2.3 | 0.48 | 0.66 | 761 | 14633 |
| 29 | Inv. ex. | 595 | 28 | 897 | 3.1 | 0.44 | 0.60 | 755 | 76575 |
| 30 | Inv. ex. | 594 | 26 | 898 | 1.8 | 0.45 | 0.57 | 731 | 14999 |
| 31 | Inv. ex. | 597 | 27 | 894 | 1.0 | 0.43 | 0.50 | 714 | 74858 |
| 32 | Comp. ex. | 593 | 15 | 876 | 1.4 | 0.33 | 0.57 | 595 | 2376 |
| 33 | Comp. ex. | 590 | 2 | 850 | 3.2 | 0.13 | 0.07 | 465 | 4934 |
| 34 | Comp. ex. | 571 | 1 | 833 | 4.5 | 0.10 | 0.08 | 473 | 2674 |
| 35 | Comp. ex. | 564 | 10 | 802 | 1.0 | 0.32 | 0.29 | 590 | 2465 |
| 36 | Comp. ex. | 599 | 5 | 804 | 1.0 | 0.22 | 0.14 | 582 | 4523 |
| 37 | Comp. ex. | 559 | 4 | 884 | 5.0 | 0.29 | 0.25 | 570 | 2754 |
| 38 | Comp. ex. | 585 | 1 | 879 | 3.2 | 0.09 | 0.18 | 467 | 2038 |
| 39 | Comp. ex. | 587 | 12 | 1200 | 4.7 | 0.65 | 0.20 | 575 | 4271 |
| 40 | Comp. ex. | 595 | 25 | 700 | 3.5 | 0.20 | 0.03 | 398 | 2816 |
| 41 | Comp. ex. | 577 | 20 | 890 | 8.0 | 0.70 | 0.27 | 471 | 1865 |
| 42 | Comp. ex. | 580 | 21 | 845 | 0.03 | 0.07 | 0.04 | 425 | 880 |
| 43 | Comp. ex. | 680 | 5 | 837 | 4.9 | 0.10 | 0.05 | 401 | 3082 |
| 44 | Comp. ex. | 490 | 9 | 880 | 3.0 | 0.25 | 0.36 | 651 | 1155 |
| 45 | Comp. ex. | 700 | 3 | 886 | 2.1 | 0.15 | 0.06 | 388 | 4670 |
| 46 | Comp. ex. | 570 | 2 | 910 | 2.5 | 0.14 | 0.07 | 507 | 575 |
| 47 | Comp. ex. | 570 | 3 | 910 | 1.2 | 0.10 | 0.06 | 556 | 4366 |
| 48 | Comp. ex. | 570 | 3 | 910 | 4.2 | 0.12 | 0.11 | 580 | 2865 |
| 49 | Comp. ex. | 590 | 10 | 1000 | 4.0 | 0.32 | 0.20 | 572 | 3482 |
| 50 | Comp. ex. | 590 | 2 | 1150 | 2.0 | 0.36 | 0.19 | 544 | 3337 |
| 51 | Comp. ex. | 590 | 4 | 900 | 6.0 | 0.32 | 0.21 | 575 | 1639 |

TABLE 4-continued

| | | | | | | | | | |
|---|---|---|---|---|---|---|---|---|---|
| 52 | Comp. ex. | 650 | 4 | 1000 | 2.0 | 0.30 | 0.10 | 518 | 1293 |
| 53 | Comp. ex. | 650 | 4 | 1000 | 2.0 | 0.30 | 0.08 | 535 | 3757 |

| Example | Fatigue test maximum Hertz stress (MPa) | Remarks |
|---|---|---|
| 26 | 4000 | |
| 27 | 4000 | |
| 28 | 3900 | B, Ti addition |
| 29 | 4000 | Ni, Cu addition |
| 30 | 3900 | B, Ti, Ni, Cu addition |
| 31 | 4000 | B, Nb, Ti, Ni, Cu, Ca, Mg, Zr, Te addition |
| 32 | 2900 | C lower limit exceeded |
| 33 | 2600 | Mn lower limit exceeded, Mn/S exceeded |
| 34 | 2500 | Mn lower limit exceeded, S upper limit exceeded, Mn/S exceeded |
| 35 | 2800 | Si, Mn lower limit exceeded, W, Mo non-addition, Al upper limit exceeded |
| 36 | 2900 | C lower limit exceeded, W non-addition |
| 37 | 2800 | Mn lower limit exceeded, W non-addition, Mn/S exceeded |
| 38 | 2600 | S upper limit exceeded, Mn/S exceeded |
| 39 | 3000 | Induction heating temp. upper limit exceeded |
| 40 | 2900 | Induction heating temp. lower limit exceeded |
| 41 | 2900 | Induction heating time upper limit exceeded |
| 42 | 2600 | Induction heating time lower limit exceeded |
| 43 | 2600 | Soft nitriding temp. upper limit exceeded |
| 44 | 2700 | Soft nitriding temp. lower limit exceeded |
| 45 | 2800 | Mn lower limit exceeded, W non-addition, Mn/S exceeded, soft nitriding temp. upper limit exceeded |
| 46 | 2600 | Mn lower limit exceeded, W non-addition, Mn/S exceeded, induction heating temp. upper limit exceeded |
| 47 | 2600 | Mn lower limit exceeded, W non-addition, Mn/S exceeded, induction heating temp. upper limit exceeded |
| 48 | 2700 | Mn lower limit exceeded, W non-addition, Mn/S exceeded, induction heating temp. upper limit exceeded |
| 49 | 2900 | Mn lower limit exceeded, W, Mo, V non-addition induction heating temp. upper limit exceeded |
| 50 | 2900 | Mn lower limit exceeded, W non-addition, Mn/S exceeded, induction heating temp. upper limit exceeded |
| 51 | 2700 | Mn lower limit exceeded, W, Mo non-addition, Mn/S exceeded, induction heating temp. upper limit exceeded |
| 52 | 2800 | C, Mn lower limit exceeded, W, Mo non-addition, nitriding temp., induction heating temp. upper limit exceeded |
| 53 | 2900 | Mn lower limit exceeded, W, Mo, V non-addition nitriding temp., induction heating temp. upper limit exceeded |

As shown in Table 3 and Table 4, the invention examples of Examples 1 to 31 all have a lifetime of the roller pitching fatigue test of 10,000,000 ($10^7$) or more and an excellent contact fatigue strength (high fatigue test life) and give good results compared with the comparative examples of Examples 32 to 53.

In the invention examples of Examples 1, 2, and 4 to 10 using the steel materials to which suitable amounts of Mn and W are added, (a) by less than 600° C. soft nitriding, a compound layer of a thickness of 10 μm is formed, (b) by quenching after an austenization temperature of less than 900° C. and 0.08 to 4.9 seconds of induction heating, a nitrided layer of a thickness of 0.4 mm or more is formed, and (c) by a high N concentration, a Vicker's hardness of 650 or more is obtained by 300° C. tempering at a position 0.2 mm from the surface.

As a result, in the invention examples of Examples 1, 2, and 4 to 10, excellent contact fatigue strength is obtained.

In the invention examples of Examples 11, 13 to 19, and 21 to 25 using steel materials to which optional elements are added as well, the lifetime in roller pitching fatigue tests is 10,000,000 or more and a good contact fatigue strength is obtained.

Furthermore, in the invention examples of Examples 3, 12, 20, and 26 to 31 (pore density of 10000/mm² or more) as well, the lifetime in roller pitching fatigue tests is 10,000,000 or more and a good contact fatigue strength is obtained.

As opposed to this, in the comparative examples of Examples 32 to 38 where steel types with chemical compositions outside the scope defined by the present invention are soft nitrided, then induction hardened, the fatigue test life does not reach 10,000,000 in each case.

In particular, in the comparative examples of Examples 33, 34, and 38, the Mn/S is low and the surface concentration of S cannot be prevented. As a result, the compound layer formed by the soft nitriding is thin, the thickness of the nitrided layer of the steel part is a small one of less than 0.4 mm after induction hardening, the N concentration from the surface down to a depth of 0.2 mm is low, and the Vicker's hardness with 300° C. tempering is a value less than 650.

In the comparative examples of Examples 39 to 42 where the chemical compositions are in the scope defined by the present invention, but the induction heating conditions exceed the conditions of the present invention, in each case, a sufficiently thick compound layer is formed by the soft nitriding, but the induction heating conditions are not sufficient, so the fatigue test life does not reach 10,000,000.

For example, in the comparative example of Example 39, the induction heating temperature is too high, N unnecessarily diffuses inside, and the thickness of the nitrided layer is 0.65 mm or in the scope of the present invention, but the N concentration of the steel part from the surface down to a depth of 0.2 mm is a low 0.20%, the 300° C. tempered Vicker's hardness is also 575, that is, does not reach 650, and furthermore an oxide layer is formed at the surface layer and the fatigue life is short.

Further, in the comparative example of Example 41, the induction heating time is too long and N unnecessarily diffuses inside and the thickness of the nitrided layer is 0.70 mm or in the scope of the present invention, but the N concentration of the steel part from the surface down to a depth of 0.2 mm is a low 0.27%, the 300° C. tempered Vicker's hardness is a low 471, and the fatigue life is short.

In the comparative examples of Examples 43 to 44 with soft nitriding conditions outside the scope of the conditions of the present invention, in each case, the compound layer is also thin, so the nitrided layer of the steel part is thin and the fatigue life does not reach 10,000,000.

For example, in the comparative example of Example 44, the chemical composition is in the range defined by the present invention, the N concentration from the surface down to a depth of 0.2 mm is a high 0.36%, and the Vicker's hardness when tempering at 300° C. is also a high value of 651, but the soft nitriding temperature is too low, so the compound layer is thin, the nitrided layer of the steel part is also a thin 0.25 mm, and the fatigue life is short.

In the comparative example of Example 45 where the chemical composition and the soft nitriding conditions exceed the scope of the present invention, the Mn/S is small and the soft nitriding temperature is too high, so the compound layer is thin. Furthermore, W is not added, so the nitrided layer of the steel part is also a thin 0.15 mm, the N concentration from the surface down to a depth of 0.2 mm is a low 0.06%, the Vicker's hardness when tempering at 300° C. is also 388, that is, does not reach 650, and the fatigue life is short.

In the comparative examples of Examples 46 to 51 where the chemical compositions and the induction heating conditions exceed the scope of the present invention, in each case, the compound layer is thin, so the nitrided layer of the steel part is thin, the 300° C. tempered hardness from the surface down to a depth of 0.2 mm is low, and the fatigue life does not reach 10,000,000.

For example, in the comparative example of Example 48, the Mn/S is small, so the compound layer is thin. Further, W is not added and the induction heating temperature is high, so the thickness of the nitrided layer of the steel part is a small 0.12 mm, the N concentration from the surface down to a depth of 0.2 mm is 0.18%, the 300° C. tempered hardness is a low 580, and the fatigue life is short.

In the comparative examples of Examples 52 to 53 with chemical compositions outside the scope defined by the present invention and, furthermore, soft nitriding conditions and induction heating conditions outside the scope of the present invention as well, the compound layer is thin, so the nitrided layer of the steel part is thin, the 300° C. tempered hardness from the surface down to a depth of 0.2 mm is low, and the fatigue life does not reach 10,000,000.

For example, in the comparative example of Example 53, the Mn/S is 70 or more, but the soft nitriding temperature is high, so the compound layer is thin. Further, W is not added and the induction heating temperature is high, so the nitrided layer of the steel part is a thin 0.30 mm, the N concentration from the surface down to 0.2 mm is 0.08%, the 300° C. tempered hardness is a low 535, and the fatigue life is extremely short.

From the above results, it is understood that in the invention examples where (a) suitable amounts of Mn and W are added and (b) soft nitriding and later induction hardening are performed under suitable conditions to obtain suitable nitrided layer thickness and hardness, an excellent contact fatigue strength is obtained.

Industrial Applicability

According to the present invention, it is possible to provide steel for structural use for surface hardening able to be applied to power transmission parts of automobiles etc. and provide steel parts having a high contact fatigue strength, in particular gears, continuously variable transmissions, constant velocity joints, hubs, bearings and other steel parts for machine structure use. As a result, the present invention greatly contributes to the higher output and lower cost of automobiles, so the industrial applicability is large.

The invention claimed is:

1. A steel part for machine structure use, containing, by mass %,
   C: 0.30 to 0.6%,
   Si: 0.02 to 2.0%,
   Mn: 1.5% to 3.0%,
   W: 0.0025 to 0.5%,
   Cr: 0.01 to 2.0%,
   Mo: 0.01 to 1.0%,
   V: 0.01 to 1.0%,
   Al: 0.001 to 0.5%,
   N: 0.003 to 0.02%,
   S: 0.0001 to 0.025%,
   P: 0.0001 to 0.03%,
   O: 0.0001 to 0.005%,
   Fe: balance, and
   unavoidable impurities,
   wherein an Mn/S is 70 to 30000,
   wherein said steel part is machined, nitrided, and then induction hardened, and
   wherein the surface layer of the steel part from the surface down to a depth of 0.4 mm or more is a nitrided layer and the hardness of the nitrided layer from the surface down to a depth of 0.2 mm has a Vicker's hardness of 650 or more if subject to tempering at 300° C.

2. The steel part for machine structure use as set forth in claim 1, characterized in that said steel is nitrided by soft nitriding.

3. The steel part for machine structure use as set forth in claim 1, characterized in that said nitrided layer from the surface down to a depth of 5 μm or more includes pores of a circle equivalent diameter of 0.1 to 1 μm in an amount of 10000/mm$^2$ or more.

4. The steel part for machine structure use as set forth in claim 1, characterized by said steel further containing, by mass %, one or more of
   B: 0.0005 to 0.005%,
   Nb: 0.005 to 0.3%,
   Ti: 0.005 to 0.2%,
   Ni: 0.05 to 2.0%,
   Cu: 0.01 to 2.0%,
   Ca: 0.0005 to 0.01%,
   Mg: 0.0005 to 0.01%,
   Zr: 0.0005 to 0.05%, and
   Te: 0.0005 to 0.1%.

5. The steel part for machine structure use as set forth in claim 4, characterized in that said steel is nitrided by soft nitriding.

6. The steel part for machine structure use as set forth in claim 4, characterized in that said nitrided layer from the surface down to a depth of 5 μm or more includes pores of a circle equivalent diameter of 0.1 to 1 μm in an amount of 10000/mm$^2$ or more.

* * * * *